(12) United States Patent
Kimura et al.

(10) Patent No.: US 7,583,064 B2
(45) Date of Patent: Sep. 1, 2009

(54) BOOSTER CIRCUIT

(75) Inventors: Kouya Kimura, Saitama (JP); Masao Nagano, Saitama (JP); Mitsuaki Hirakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 341 days.

(21) Appl. No.: 11/727,776

(22) Filed: Mar. 28, 2007

(65) Prior Publication Data
US 2008/0012626 A1 Jan. 17, 2008

(30) Foreign Application Priority Data
Mar. 29, 2006 (JP) .............................. 2006-090522

(51) Int. Cl.
*G05F 1/613* (2006.01)

(52) U.S. Cl. .................... 323/262; 323/225; 323/222

(58) Field of Classification Search ................. 323/262, 323/225, 222, 223, 247, 255, 259, 266, 268, 323/271, 272, 232; 363/24–26, 59–60, 65, 363/67, 69, 70
See application file for complete search history.

(56) References Cited

FOREIGN PATENT DOCUMENTS

| JP | 11-146635 | 5/1999 |
| JP | 2005-224058 | 8/2005 |

*Primary Examiner*—Akm E Ullah
*Assistant Examiner*—Harry Behm
(74) *Attorney, Agent, or Firm*—Squire, Sanders & Dempsey L.L.P.

(57) ABSTRACT

A booster circuit according to an embodiment of the present invention comprises: an input terminal; an output terminal; a common terminal; a transformation unit including first, the second, and the third windings, the windings wound in the same direction and connected in series; a first rectifier unit provided between the input terminal and a connection point of the first and the second windings; a second rectifier unit provided between the input terminal and a connection point of the second and the third windings; a first switching unit provided between one end of the transformation unit and the common terminal; a second switching unit provided between other end of the transformation unit and the common terminal; a third rectifier unit provided between a connection point of one end of the transformation unit and the first switching element and the output terminal; and a fourth rectifier unit provided between a connection point of other end of the transformation unit and the second switching element and the output terminal. The first winding and the third winding have the approximately same number of turns, and the first switching element and the second switching element open and close alternately to each other in response to a pair of control signals. Thereby, it is possible to provide a booster circuit that is capable of generating an output voltage, which is more than twice as high as an input voltage, and can be reduced in the size and the weight.

17 Claims, 14 Drawing Sheets

SW1 AND SW2 ARE TURNED OFF

OUTPUT A VOLTAGE DIRECTLY THROUGH D3 AND D4

SW1 IS TURNED ON

OUTPUT A VOLTAGE THREE TIMES AS HIGH AS AN INPUT VOLTAGE OF THE TRANSFORMER THROUGH D4

SW2 IS TURNED ON

OUTPUT A VOLTAGE THREE TIMES AS HIGH AS AN INPUT VOLTAGE OF THE TRANSFORMER THROUGH D3

DRIVING SIGNAL A

Vsw11

Ii

Ic12

DRIVING SIGNAL A

Vsw1

Iin

Ic

BOOSTER CIRCUIT

CROSS-REFERENCE TO RELATED APPLICATION(S)

This application claims the foreign priority benefit under Title 35, United States Code, §119 (a)-(d), of Japanese Patent Application No. 2006-090522, filed on Mar. 29, 2006 in the Japan Patent Office, the disclosure of which is herein incorporated by reference in its entirety.

BACKGROUND OF THE INVENTION

1. Field of the Invention

The present invention relates to a booster circuit that is used in a power supply circuit, a power supply device, or the like, and is capable of outputting a boosted input voltage.

2. Description of the Related Art

As disclosed in Japanese Laid-open Patent Application No. 2005-224058, the applicant of the present invention has proposed a booster DC/DC converter wherein even a small-sized converter can handle a large amount of electricity by preventing magnetic saturation in a core of the converter by magnetic offset. Specifically, the booster DC/DC converter includes a transformer having the first and the second coils wound around the same core in reverse direction (opposite phase), and a pair of switches. An exciting current flows through the first coil, and at the same time a current is generated in the second coil in such a direction that magnetic flux of the core is offset. Then, the current in the second coil is fed into an output side via a diode, thereby obtaining an output voltage, which is approximately twice as high as the input voltage.

Another example of a booster circuit is shown in FIG. 12. FIG. 12 illustrates an electric diagram of a configuration of a conventional booster circuit. A booster circuit 9 has a classical circuit configuration, which is a prototype of various types of booster DC/DC converters. The booster circuit 9 includes a capacitor C11 interposed between an input terminal Vin and a common terminal COMMON, an inductor L11 provided on an input side and having one end connected to the input terminal Vin, a diode D11 having its anode connected to another end of the inductor L11 and its cathode connected to an output terminal Vout, a switch element SW11 interposed between the common terminal COMMON and a connection point of the inductor L11 and the diode D11, and a capacitor C12 interposed between the output terminal Vout and the common terminal COMMON.

Furthermore, there has been proposed a direct-current power supply device for obtaining an output voltage, which is more than twice as high as the input voltage, as disclosed, for example, in Japanese Laid-open Patent Application H11-146635. FIG. 13 illustrates an electric diagram of a booster circuit disclosed in the application. In the booster circuit, a winding wound around a transformer T15 is provided with a center tap P13, and taps P12, P14, which are arranged symmetrically about the center tap P13. One input voltage is applied to the center tap P13, and the other input voltage is applied to the taps P12, P14 via switch elements SW15, SW16, so that an output voltage is obtained from both ends of the winding via diodes D15, D16 by a wired OR technique.

However, the booster DC/DC converter disclosed in the above-mentioned Japanese Laid-open Patent Application No. 2005-224058, which employs a principle of converting a voltage by a converter, is required to have a higher voltage boost ratio.

Because the reactor (inductor) L11 itself performs a boost function in principle in the booster circuit shown in FIG. 12, the large reactor L11 is required and the output smoothing capacitor C12 is required to have a large capacity so as to withstand a large ripple current. Therefore, it is difficult to reduce the whole size of the booster circuit shown in FIG. 12.

In the direct-current power supply device disclosed in the above-mentioned Japanese Laid-open Patent Application H11-146635, for example, when the switch element SW15 is turned on, a raised voltage is induced in a terminal P15 of the transformer T15, and at the same time a negative voltage occurs in a terminal P11 of the transformer T15. As a result, inverse voltage is applied to the diode D15 (when the switch element SW16 is turned on, an inverse voltage is applied to the diode D16), and therefore the diodes D15, D16 need to have a higher inverse voltage withstand. Furthermore, a current does not flow in the negative voltage in the terminal P11, thereby easily causing a surge voltage.

In the booster chopper circuit, which employs a transformation function of a transformer as described above, a large core is required in order to prevent magnetic saturation upon direct-current magnetization, thereby making it difficult to reduce the size and the weight of the circuit.

SUMMARY OF THE INVENTION

The present invention is accomplished to solve the above-mentioned problem, and the object of the present invention is to provide a booster circuit that is capable of generating an output voltage, which is more than twice as high as an input voltage, and can be reduced in the size and the weight.

According to an aspect of the present invention, there is provided a booster circuit configured as follows. Specifically, a booster circuit includes: an input terminal and a common terminal, an input voltage applied to the input terminal and the common terminal; an output terminal, in which an output voltage is provided on the common terminal; a transformation unit that includes a first winding, a second winding, and a third winding, the windings wound in a same direction and connected in series; a first rectifier unit (D1) provided between the input terminal and a connection point of the first winding and the second winding; a second rectifier unit (D2) provided between the input terminal and a connection point of the second winding and the third winding; a first switching unit provided between one end of the transformation unit and the common terminal; a second switching unit provided between other end of the transformation unit and the common terminal; a third rectifier unit (D3) provided between a connection point of the one end of the transformation unit and the first switching unit and the output terminal; a fourth rectifier unit (D4) provided between a connection point of the other end of the transformation unit and the second switching unit and the output terminal. In the booster circuit, the first winding and the third winding have an approximately same number of turns, and the first switching unit and the second switching unit alternately open and close in response to a pair of control signals.

With the configuration of the booster circuit, when one of the switching units is turned on and a current flows through the first winding, the same voltage as the one applied in the first winding occurs in the second and third windings. Then, the voltage three times as high as the one applied in the first winding is output through a path, on which another switching unit is connected, thereby generating the output voltage, which is more than twice as high as an input voltage.

According to another aspect of the present invention, there is provided the booster circuit wherein the circuit includes a choke coil provided with a conductor connecting the input terminal and a connection point of the first rectifier unit and the second rectifier unit.

With the configuration of the booster circuit, it is possible to prevent a rapid change of a current by a choke coil.

According to a further aspect of the present invention, there is provided the booster circuit wherein the circuit includes a generation unit for generating the pair of control signals having a duty cycle to set the output voltage to a predetermined value.

With such a configuration, it is possible to adjust an output voltage by adjusting the duty cycle of the control signal.

According to a still further aspect of the present invention, there is provided a booster circuit wherein the circuit includes a capacitor disposed between the input terminal and the common terminal.

Thereby, it is possible to prevent fluctuation of an output voltage by the capacitor within its tolerance range.

According to a still further aspect of the present invention, there is provided a booster circuit wherein the circuit includes a capacitor disposed between the output terminal and the common terminal.

With such a configuration, it is possible to reduce the ripple content because the capacitor absorbs the voltage fluctuation.

According to a still further aspect of the present invention, there is provided a booster circuit wherein the first winding includes the a fourth winding and a fifth winding connected in series to the fourth winding, the fourth winding connected in series to the second winding and having a predetermined ratio of a number of turns to that of the second winding; the third winding includes a sixth winding and a seventh winding connected in series to the sixth winding, the sixth winding connected in series to the second winding and having the predetermined ratio of the number of turns to that of the second winding, the fourth, the fifth, the second, the sixth, and the seventh windings wound in a same direction; a first selection switching unit is disposed between a connection point of the fourth and the fifth windings and a connection point of the first switching unit and the third rectifier unit; a second selection switching unit is disposed between a connection point of the sixth and the seventh windings and a connection point of the second switching unit and the fourth rectifier unit; two circuits including a third selection switching unit and a fourth selection switching unit are disposed between the one end of the transformation unit and the common terminal, and between the other end of the transformation unit and the common terminal, respectively, each of the two circuits having a same configuration as the circuit connected between the connection point of the fourth and the fifth windings and the common terminal; two diodes, which are provided to prevent a reverse current, are disposed between the one end of the transformation unit and the third selection switching unit, and between the other end of the transformation unit and the fourth selection switching unit, respectively; the first selection switching unit and the second selection switching unit are switched by a selection signal to select an output voltage; and the third and the fourth selection switching units are switched by a signal generated by inverting the selection signal.

With the above configuration, it is possible to select a circuit to be operated by a selection signal, thereby changing an output voltage.

According to the booster circuit of the present invention, it is possible to generate an output voltage, which is more than twice as high as an input voltage, and reduce the size and the weight of the circuit. Therefore, by the circuit of the present invention, it is possible to provide power supply circuit and system which has a superior function of boosting a voltage.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Figure 1:
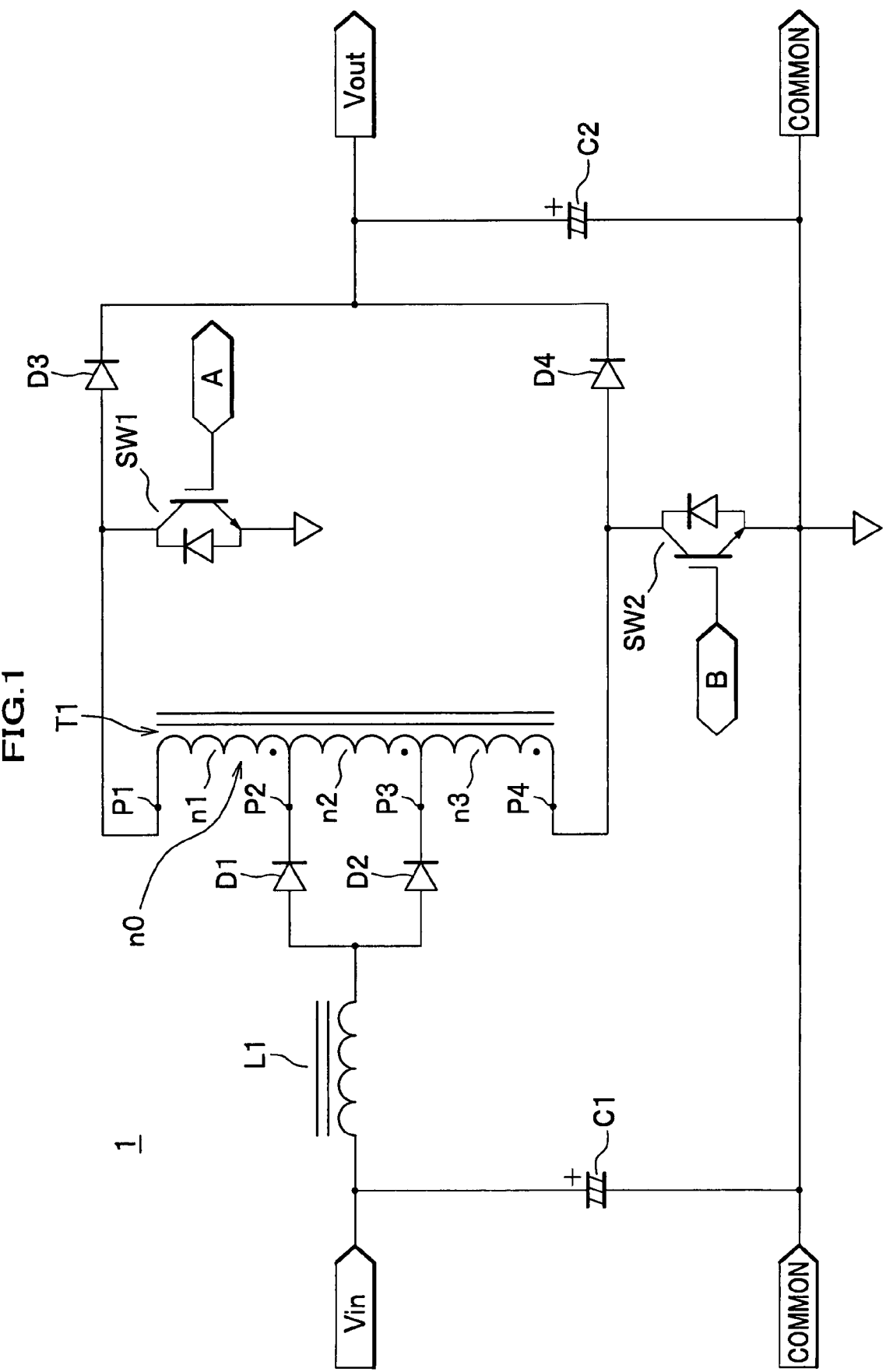
FIG. 1 illustrates a circuit diagram of a configuration of a booster circuit according to the first embodiment of the present invention.

Hereinafter, an embodiment of the present invention will be described in detail with reference to the attached drawings. The same components in the drawings will be denoted by the same reference numerals.

First Embodiment

FIG. 1 illustrates a circuit diagram of a configuration of a booster circuit according to the first embodiment of the present invention. In FIG. 1, the booster circuit 1 includes an input terminal Vin and a common terminal COMMON, to both of which an input voltage to be converted is applied, a smoothing capacitor C1 interposed between the input terminal Vin and the common terminal COMMON, a inductor L1 provided on an input side and having one end connected to a connection point of the input terminal Vin and the capacitor C1, diodes D1, D2 each having its anode connected to another end of the inductor L1, a transformer T1 (transformation unit) having windings n1, n2, n3, which are divided by taps P2, P3 connected to cathodes of the diodes D1, D2, respectively, switch elements, SW1, SW2 interposed between the common terminal COMMON and conducting wires (hereinafter, referred to as a lead wire of the winding n1 and a lead wire of the winding n3 so as to be distinguished from the taps P2, P3) led from ends of the windings n1, n3 of the transformer T1, a diode D3 having its anode connected to a connection point of the lead wire of the winding n1 and the switch element SW1, a diode D4 having its anode connected to a connection point of the lead wire of the winding n3 and the switch element SW2, an output terminal Vout, to which cathodes of the diodes D3, D4 are connected, that provides an output voltage between the output terminal and the common terminal, and a smoothing capacitor C2 interposed between the common terminal COMMON and the output terminal Vout.

The transformer T1, which is a transformation unit, includes a winding wound around a core (for example, ferrite core or iron core), the winding divided into the windings n1, n2, n3, by the taps P2, P3. Lead wires or terminals, which are led from both ends of the whole winding including the windings n1, n2, n3, are denoted by P1 and P4, respectively. Hereinafter, the each winding is simply referred to as a winding, and the whole winding including the respective windings is denoted by n0. In the following description, the number of turns of the windings n1, n2, n3, are denoted by N1, N2, N3, respectively. According to the present invention, the number of turns of the winding n1 and the winding n3 must be equal, that is N1=N3. In this embodiment, the taps P2, P3 are provided in the process of forming the winding n0 so that the numbers of turns of the windings n1 and n3 become equal, and therefore naturally the windings n1, n2, n3 are wound in the same direction. Thereby, when electricity is applied between the terminals P1, P4 of the winding n0, each winding ni (i=1, 2, 3) forms magnetic flux in the core in the same direction. In order to illustrate this in the drawings, black circles are marked in each of the winding ni in the same direction.

The capacitor C1 on the input side is not necessarily indispensable except when a power source or battery, which supplies power for the booster circuit 1, is located nearby, and the capacitor C1 is provided to reduce source impedance in the circuit and stabilize its operation.

Figure 12:
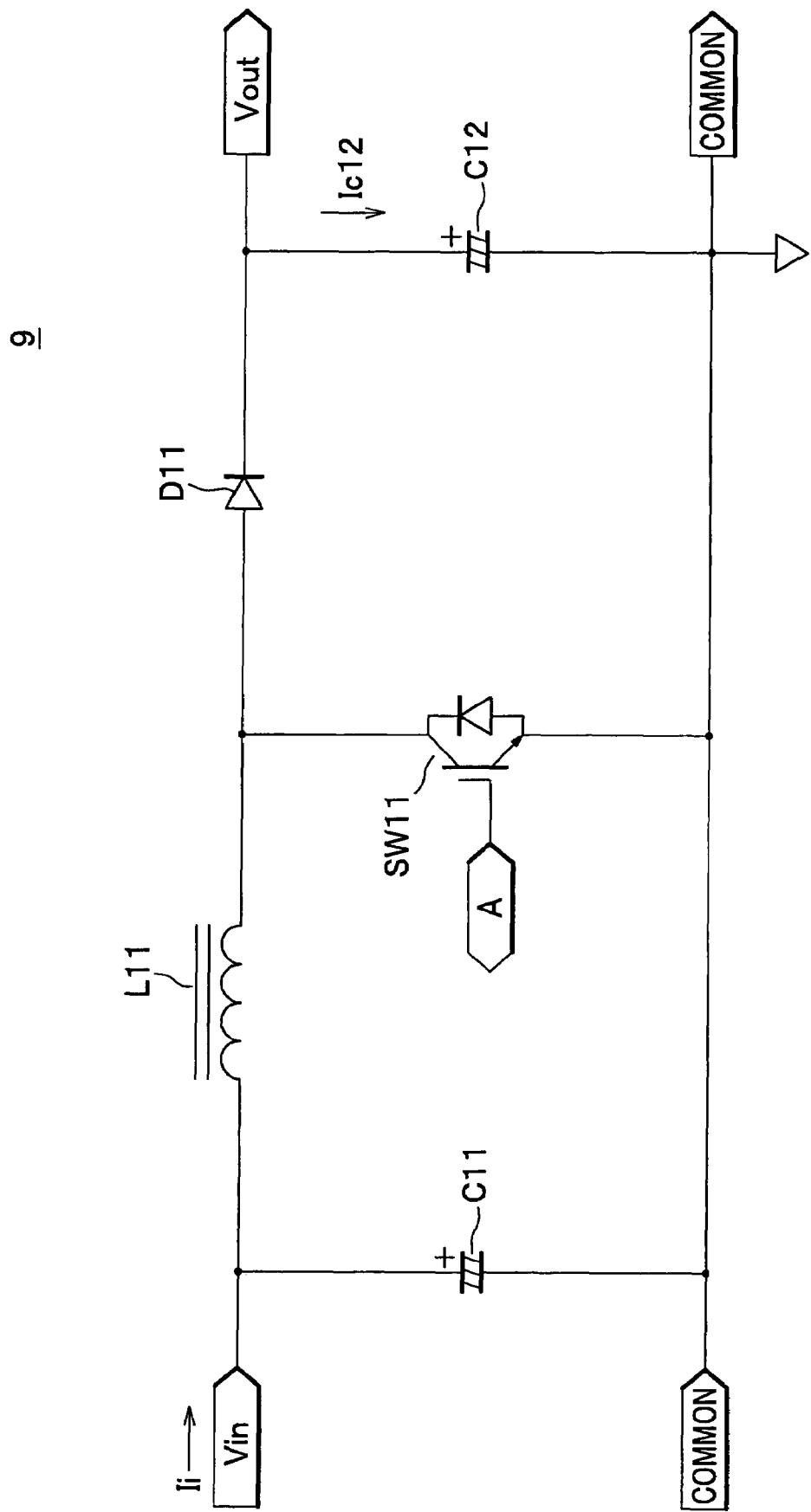
FIG. 12 illustrates an electric diagram of a configuration of a conventional booster circuit.
Figure 13:
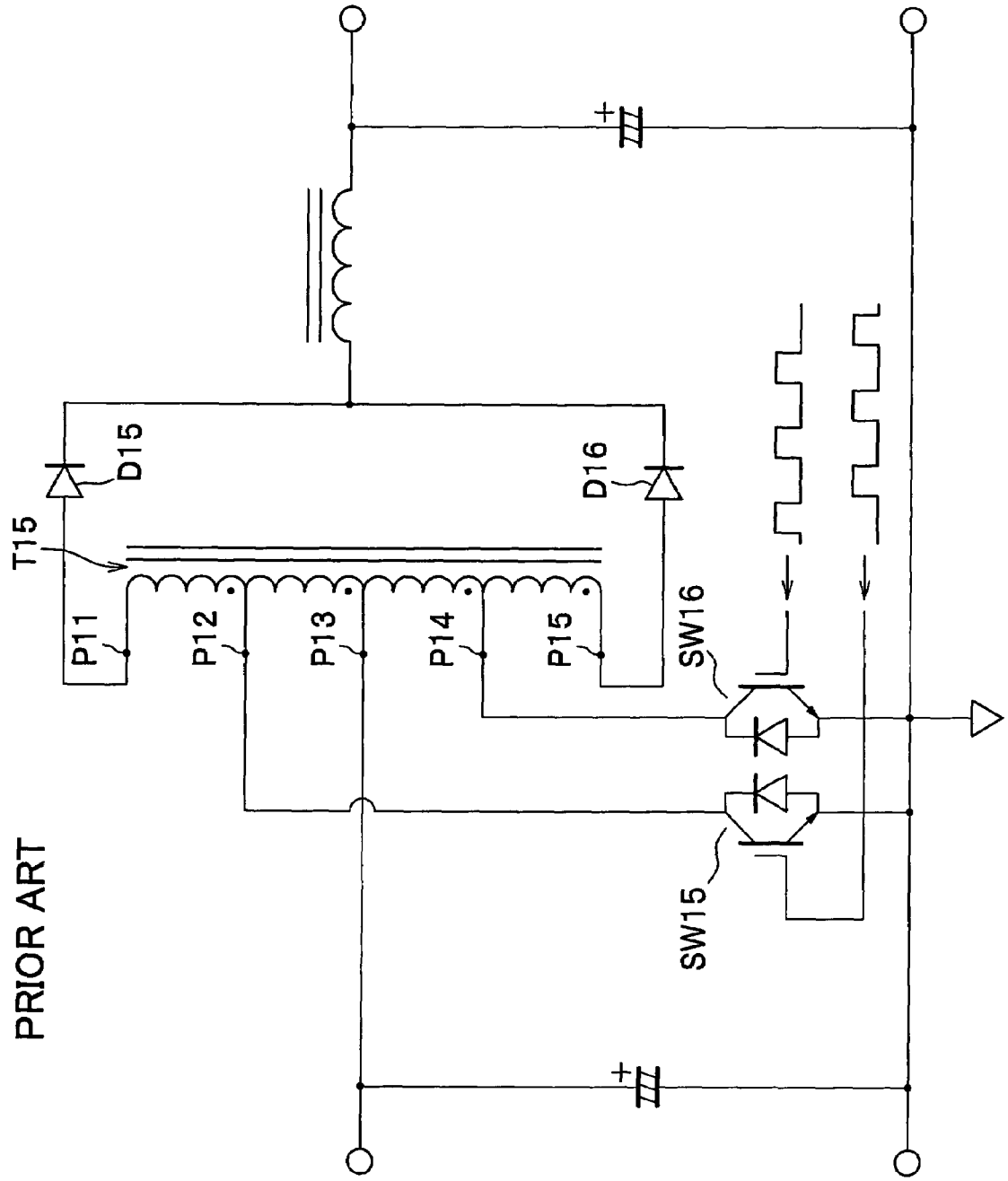
FIG. 13 illustrates an electric diagram of another conventional booster circuit.

The inductor L1 provided on the input side functions as a choke coil. Unlike a coil in a classical booster circuit, wherein the coil is used to accumulate and release energy so as to step up a voltage, the inductor L1 is provided to keep in a certain range a current change rate di/dt, which could become large on the switch element SW1 (a first switching unit) and the SW2 (a second switching unit) being switched, that is, the inductor L1 is provided to reduce the current change rate di/dt. For this reason, the inductor L1 shown in FIG. 1 may have a smaller size than the conventional inductor as shown in FIG. 12.

Each of the diodes D1, D2, each of which serves as a rectifier unit, has its anode connected to the inductor L1 on the input side and its cathode connected to the taps P2, P3, respectively, of the transformer T1. A diode is used as each of the rectifier units D1 to D4 in the booster circuit 1 of FIG. 1, but any appropriate element may be used as long as it has a rectification function.

The diodes D1, D2 automatically operates to select a path, through which a current flows into the transformer T1 when the switch elements SW1, SW2 are alternately turned on. As schematically illustrated in FIG. 5, an operation is automatically performed as if a supporting point of a seesaw shifts every time the switch elements SW1, SW2 are turned on/off. Specifically, when the switch element SW1 is turned on, a current is fed into the transformer T1 though the diode D1 so that a voltage is applied to the winding n1 and a current does not flow through the diode D2. In the transformer T1, a voltage is induced in the windings n2, n3, and then the voltage is output from the winding n3 side through the diode D4. When SW1 is turned off and SW2 is turned on, a current is fed through D2 so that a voltage is applied to n3 and a current does not flow through D1. A voltage is induced in the windings n1, n2, and then the voltage is output from the winding n1 side through the diode D3. When a high speed switching operation is required, the diodes D1 to D4 (rectifier element) are preferably a fast recovery diode (FRD) or a schottky barrier diode (SBD).

In FIG. 1, an insulated gate bipolar transistor (IGBT) is used as the switch elements SW1, SW2, which serve as an opening and closing unit, but any appropriate element such as a MOSFET (metal-oxide semiconductor field-effect transistor) or a bipolar transistor may be used as long as the element can open and close at the speed required for the application.

The element C2 is a capacitor that is provided on the output side and is dedicated to filtering ripples. The booster circuit 1 according to the present invention may have a small capacity because there occurs a smaller amount of a ripple current when the capacitor C2 is charged and discharged, compared to a classical booster circuit, as described later.

Figure 2:
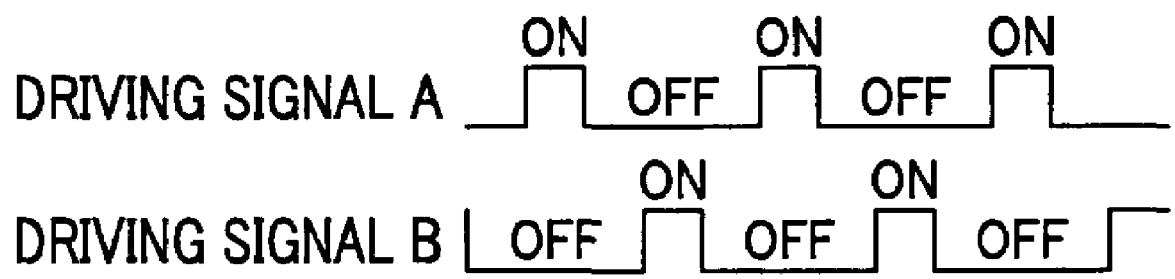
FIG. 2 illustrates an example of waveforms of driving signals, which are applied to gate terminals of switch elements in FIG. 1.

Next, a description will be given on an operation of the booster circuit 1 configured as above with reference to FIGS. 3 to 5. In the booster circuit 1 shown in FIG. 1, rectangular waves (referred to as a driving signal A and a driving signal B), which have a duty cycle of less than or equal to 50% and nearly opposite phases to each other, are applied to control terminals (gate terminals in FIG. 1) A, B of the switch elements SW1, SW2, which serve as an opening and closing unit. FIG. 2 illustrates an example of waveforms of the driving signals A and B.

Figure 3A:
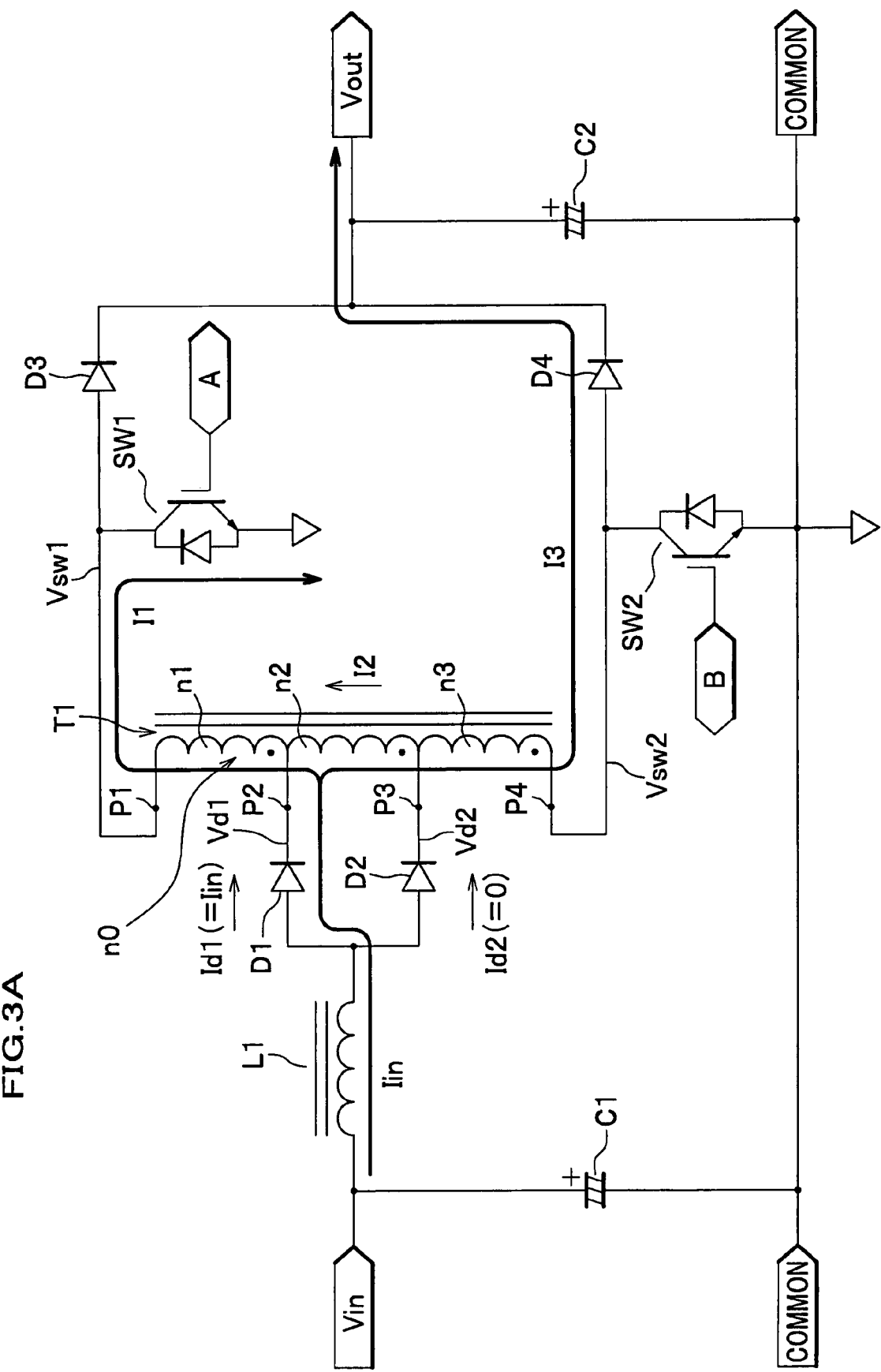
FIG. 3A illustrates a flow of a current when a first switch element is turned on in the booster circuit according to the first embodiment of the present invention.
Figure 3B:
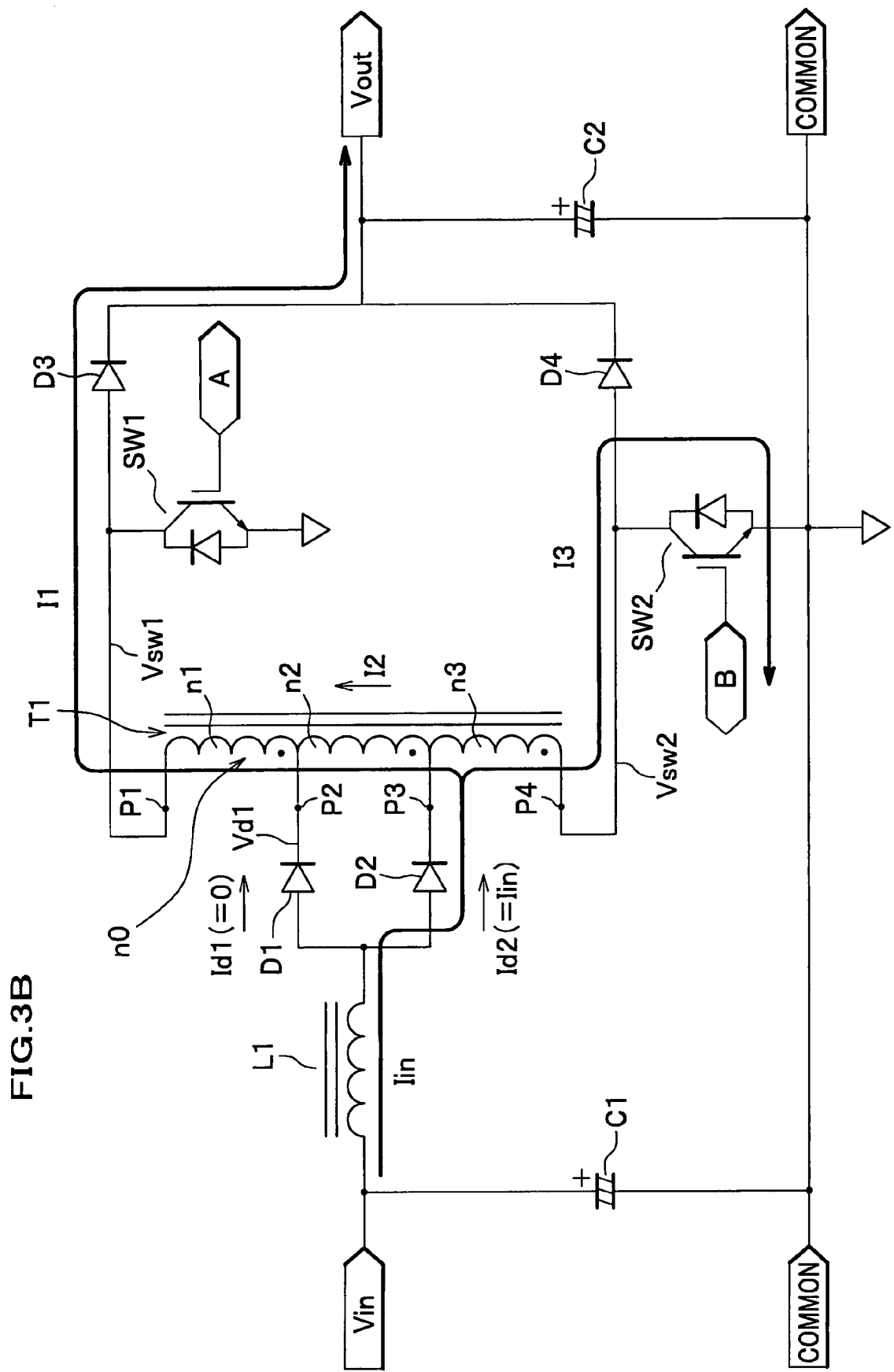
FIG. 3B illustrates a flow of a current when a second switch element is turned on in the booster circuit according to the first embodiment of the present invention.
Figure 4:
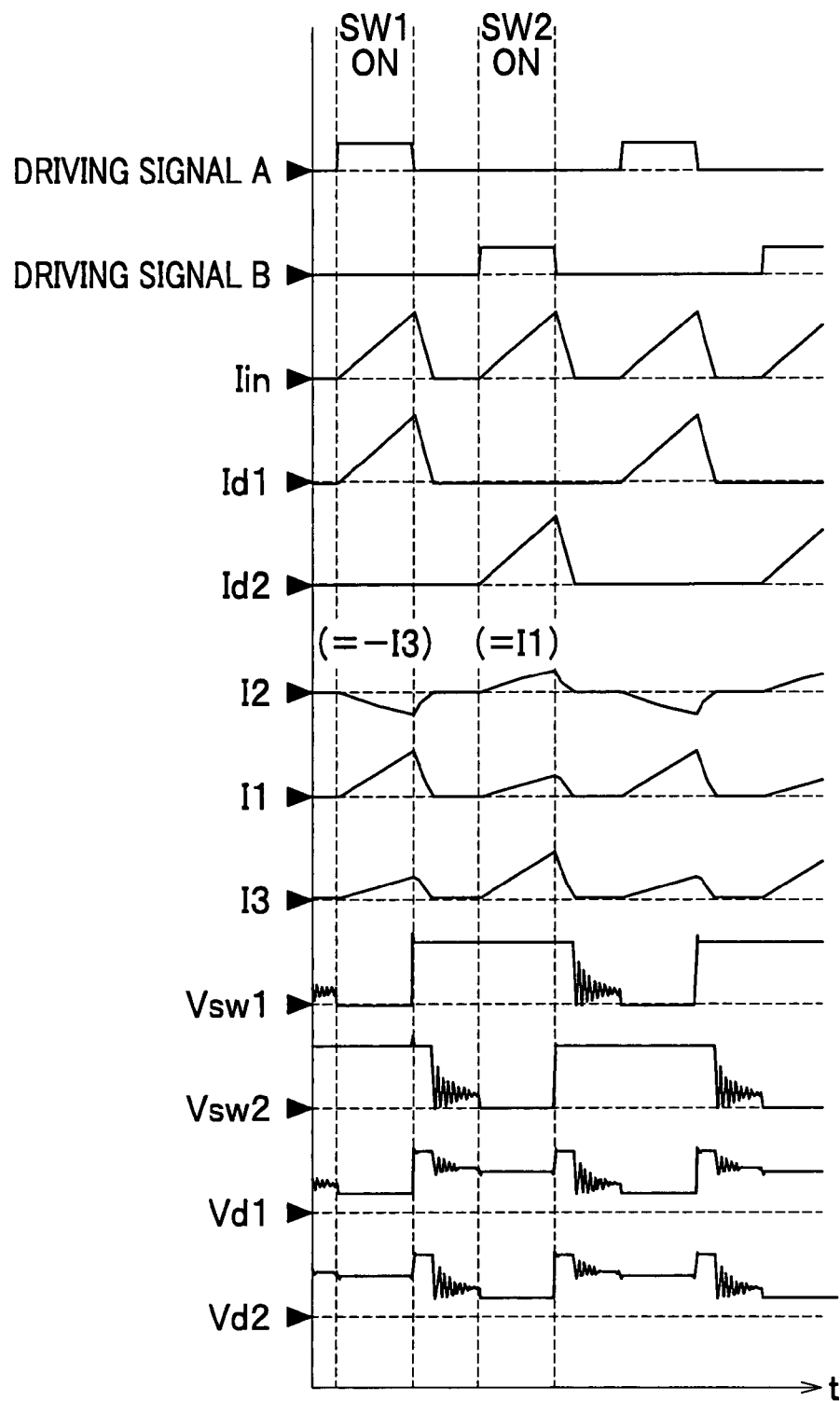
FIG. 4 is a graph showing signal waveforms of each of devices in the booster circuit according to the first embodiment of the present invention.

FIG. 3A illustrates an operation when the switch element SW2 is turned off and the switch element SW1 is turned on. FIG. 3B illustrates an operation when the switch element SW1 is turned off and the switch element SW2 is turned on. FIG. 4 is a graph showing signal waveforms of each of the devices in the booster circuit 1. FIG. 5 schematically illustrates the principle of operations of the booster circuit 1 shown in FIG. 1.

In FIG. 3A, a current that flows through the inductor L1 is denoted by Iin, currents that flow through the diodes D1, D2 are denoted respectively by Id1, Id2, a current that flows from the lead wire P1 through the winding n1 is denoted by I2, a current that flows from the tap P3 to the tap P2 through the winding n2 is denoted by I2, a current that flows from the lead wire P4 through the winding n3 is denoted by I3. An input voltage is denoted by Vin, cathode voltages of the diodes D1, D2 are respectively denoted by Vd1, Vd2, voltages of the switch elements SW1, SW2 on the winding side are respectively denoted by Vsw1, Vsw2, and an output voltage is denoted by Vout.

Figure 5A:
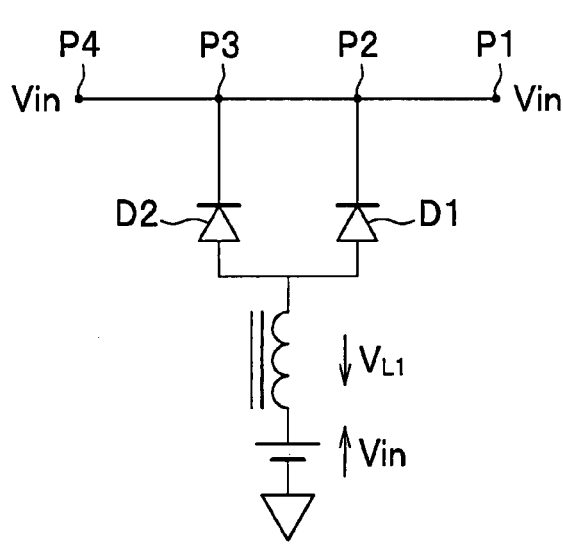
FIG. 5 schematically illustrates the principle of operations of the booster circuit according to the first embodiment of the present invention.

When the switch elements SW1, SW2 are both turned off, as shown in FIG. 5A, the input voltage Vin is more or less directly output through the inductor L1 on the input side, the diodes D1, D2, the windings n1, n3, and the diodes D3, D4, although the input voltage Vin decreases by the voltage drop.

Figure 7:
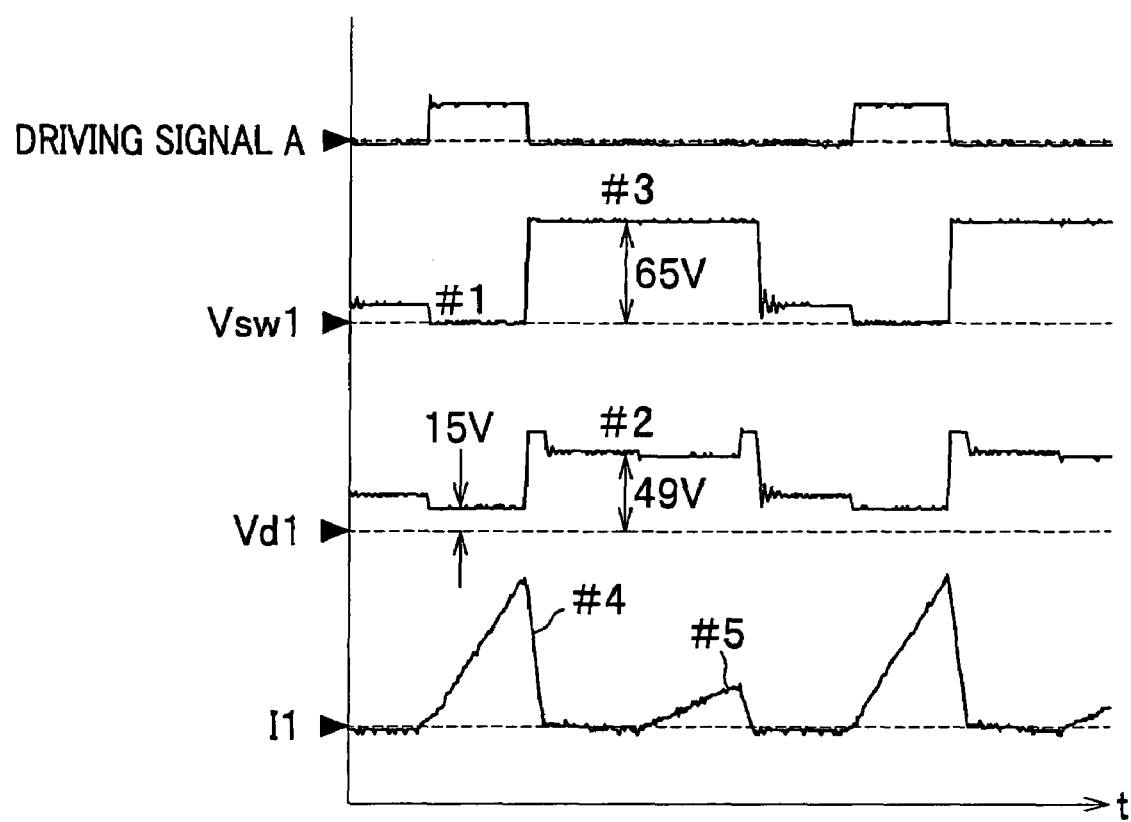
FIG. 7 is a graph showing signal waveforms of each of devices of the booster circuit on the condition that the numbers of turns of windings n1, n2, n3 in a transformer in FIG. 1 is determined such that N1: N2: N3=1:2:1.

With reference to FIGS. 3A and 7, a description will be given on an operation when the switch element SW2 is turned off and the switch element SW1 is turned on. In this case, because the switch element SW1 is electrically conducted, a connection point of the switch element SW1 and the terminal P1 becomes grounded. For this reason, the voltage Vsw1 of the connection point is 0 (zero) while the switch element SW1 is left on. Therefore, the current I1 flows through the inductor L1, the diode D1, the winding n1, and the switch element SW1. The current I1 continuously increases while the switch element SW1 is left on, and the current I1 is reduced to zero when the switch element SW1 is turned off. When the current I1 flows through the winding n1, at the same time an induced current I3 is generated in the windings n2, n3 due to mutual induction effect. The current I3 flows through the inductor L1, the diode D1, the windings n2, n3, and the diode D4 so as to be applied to the load side. As mentioned above, the input current Iin (which is equal to Id1 when SW1 is turned on) is divided into the currents I1 and I3 at the tap P2. As is well known, the windings having common magnetic flux path have equal magnetic force (ampere turns), which is the product of a current flowing through each winding and the number of turns of the winding. If the windings n1, n2, n3 have the same number of turns, the ratio of the current I1 and the current I3 is 2:1 because the current I1 flows through the winding n1 and the current I3 flows through the windings n2 and n3. That is, ⅔ of the input current Iin is the current I1, and ⅓ of the input current Iin is the current I3.

The current I2 flowing through the winding n2 is determined to flow in the direction from P3 to P2, as shown in FIG. 3A. As shown in FIG. 4, a waveform of the current I2 is negative during the ON period of SW1 and the subsequent decay time, which means that the current I3 flows from P2 to P3.

When the windings have the ratio of n1: n2: n3=1:1:1, an equal voltage is induced in each winding ni, that is, a voltage between P1 and P2=a voltage between P2 and P3=a voltage between P3 and P4=Vd1. A voltage on the path where the current I1 flows has the following relation.

$$Vin = V_{L1} + Vd1 \quad (1)$$

$V_{L1}$ is a voltage between both ends of the inductor L1 on the input side.

On the other hand, a voltage on the path where the current I3 flows has the following relation.

$$Vout = Vin + V_{L1} + 2 \cdot Vd1 \quad (2)$$

Therefore, an output voltage is derived from the equations (1) and (2).

$$Vout = 3 \cdot Vin - V_{L1} \quad (3)$$

In the booster circuit 1 according to the present invention, the inductor L1 on the input side serves as a choke coil.

As is well know, a voltage of the inductor L1 depends on the ON period of SW1, that is, a duty cycle. Therefore, when the inductor L1 is provided in the circuit, a voltage of the inductor L1 can be changed by changing a duty cycle of the driving signal A, which is applied to the gate terminal A of the switch element SW1. However, when the inductor L1 is not provided in the circuit, the output voltage Vout becomes three times as high as the input voltage Vin irrespective of a duty cycle of the driving signal. The above description assumes that there is no loss in the inductor L1 and the transformer T1, or no resistance in the diodes D1, D4, and the switch element SW1. In fact there are such loss and resistance, and therefore the output voltage Vout does not become three times as high as the input voltage Vin on the assumption that the windings n1, n2, n3 have the same number of turns. By adjusting the ratio of the number of turns, the output voltage Vout can be more than three times as high as the input voltage Vin.

As mentioned above, in the booster circuit 1 according to the present invention, the currents having the same ampere turns flow from the tap P2 in opposite directions so that magnetic flux in the core of the transformer T1 is offset and a density of the magnetic flux in the core becomes very small. In the booster circuit 1, as mentioned above, the density of the magnetic flux in the core of the transformer T1 becomes very small, thereby reducing the possibility of magnetic saturation. Therefore, the size of the transformer T1 can be reduced.

When the switch element SW1 is changed from on to off, the current I1 flowing from the winding n1 through the lead wire P1 is attenuated and then reduced to zero. During this period, the current I1 is applied to the load side through the diode D3. Accordingly, the current I3 is attenuated and reduced to zero. The current I3 flows on the same path as when SW1 is turned on. Therefore, the input current Iin (which is equal to Id1) is attenuated and reduced to zero as well as the currents I1, I3.

When the switch element SW1 is changed from on to off, a flyback voltage occurs at the connection point of the cathode of the diode D1 and the tap P2 of the transformer T1 due to the energy accumulated in the inductor L1, thereby extremely raising the cathode voltage of the diode D1 for a moment. However, the voltage is output through the diodes D3, D4, and then the voltage is clamped at the output voltage Vout. When the voltage Vd1 is lower than the output voltage Vout, the voltage Vd1 vibrates and disappears due to floating LCR component, which occurs from the inductor L1 to the diodes D3, D4. The voltage Vsw1 of the lead wire P1 of the winding n1 rises up to the output voltage Vout simultaneously when the switch element SW1 is turned off, and the voltage Vsw2 of the lead wire P4 of the winding n3 becomes nearly twice as high as the voltage Vd1 of the tap P2. Because the voltage Vsw1 of the lead wire P1 of the transformer T1 and the voltage Vsw2 of the lead wire P4 are output through the diodes D3 and D4, respectively, the output voltage Vout is determined to be a higher voltage between the voltage Vsw1 and the voltage Vsw2.

The above description is given on the case where the switch element SW2 is turned off. As shown in FIG. 3B, when the switch element SW2 is turned on, a contrary operation to the above operation is performed by the diode D2. When the switch element SW1 is turned off and the switch element SW2 is turned on, the voltage Vsw2 of the lead wire P4 of the transformer T1 becomes zero. The cathode voltage (which is equal to the voltage of the tap P3 of the transformer T1) Vd2 of the diode D2 is equal to the cathode voltage Vd1 of the diode D1 as when SW2 is turned off and SW1 is turned on, and the voltage Vsw1 of the lead wire P1 of the transformer T1 becomes twice as high as the voltage Vd2.

Figure 5B:
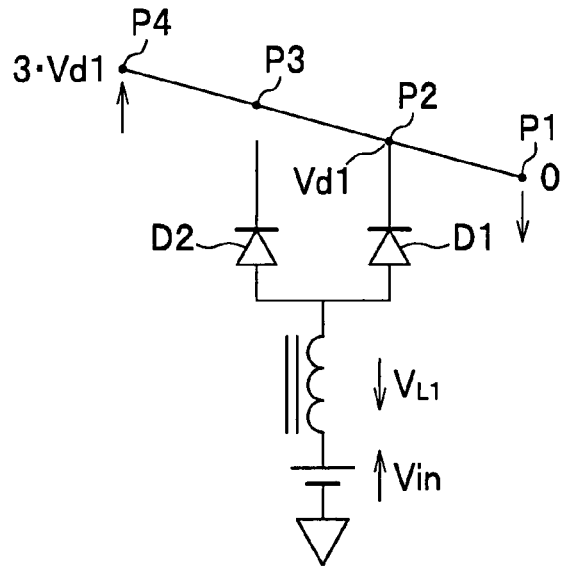
Figure 5C:
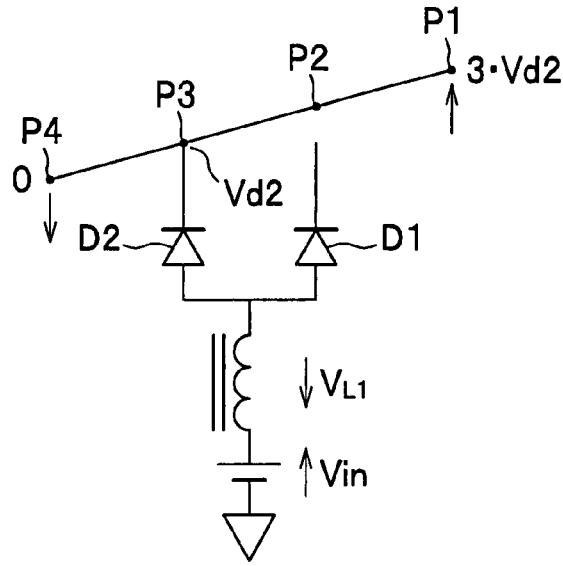

As shown in FIG. 5, the above-mentioned operation of the booster circuit 1 is similar to an operation of a see-saw. Specifically, as shown in FIG. 5B, when the switch element SW1 is turned on, the voltage of the lead wire P1 is reduced to zero and the diode D1 serves as a supporting point to perform the operation. As a result, the voltage of the lead wire P4 becomes three times as high as the voltage Vd1 of P2, and is output through the diode D4. On the contrary, as shown in FIG. 5C, when the switch element SW2 is turned on, the voltage of the lead wire P4 is reduced to zero and the diode D2 serves as a supporting point to perform the operation. As a result, the voltage of the lead wire P1 becomes three times as high as the voltage Vd2 of the lead wire P3, and is output through the diode D3.

<The Ratio of the Number of Turns>

The above description assumes that the windings n1, n2, n3 have the same number of turns. According to the present invention, it is sufficient that the windings n1, n3, between which the winding n2 is interposed, have the same number of turns. Therefore, a voltage boost ratio can be controlled by changing the ratio of the number of turns N2:N1 (=N3). The number of turns of the windings n1, n3 are respectively denoted by N1, N3, thereby obtaining the following equation, which is determined by the above equation (2).

$$Vout = Vin + V_{L1} + (N2/N1) \cdot Vd1 + Vd1 \qquad (4)$$
$$= Vin + V_{L1} + (1 + N2/N1) \cdot Vd1$$

The equation (1) determines that $Vin = V_{L1} + Vd1$, and therefore the output voltage is determined as follows.

$$Vout = (2 + N2/N1)Vin - (N2/N1) \cdot V_{L1} \qquad (5)$$

For example, when the ratio of the number of turns is N2:N1 (=N3)=2:1, the output voltage Vout is determined as $4Vin - 2V_{L1}$ by the equation (5).

According to the present invention, the output voltage can be adjusted in the range of voltages, which are more than twice as high as the input voltage, by changing the ratio of the number of turns of the windings of the transformer T1.

Preferred Embodiment

Figure 6:
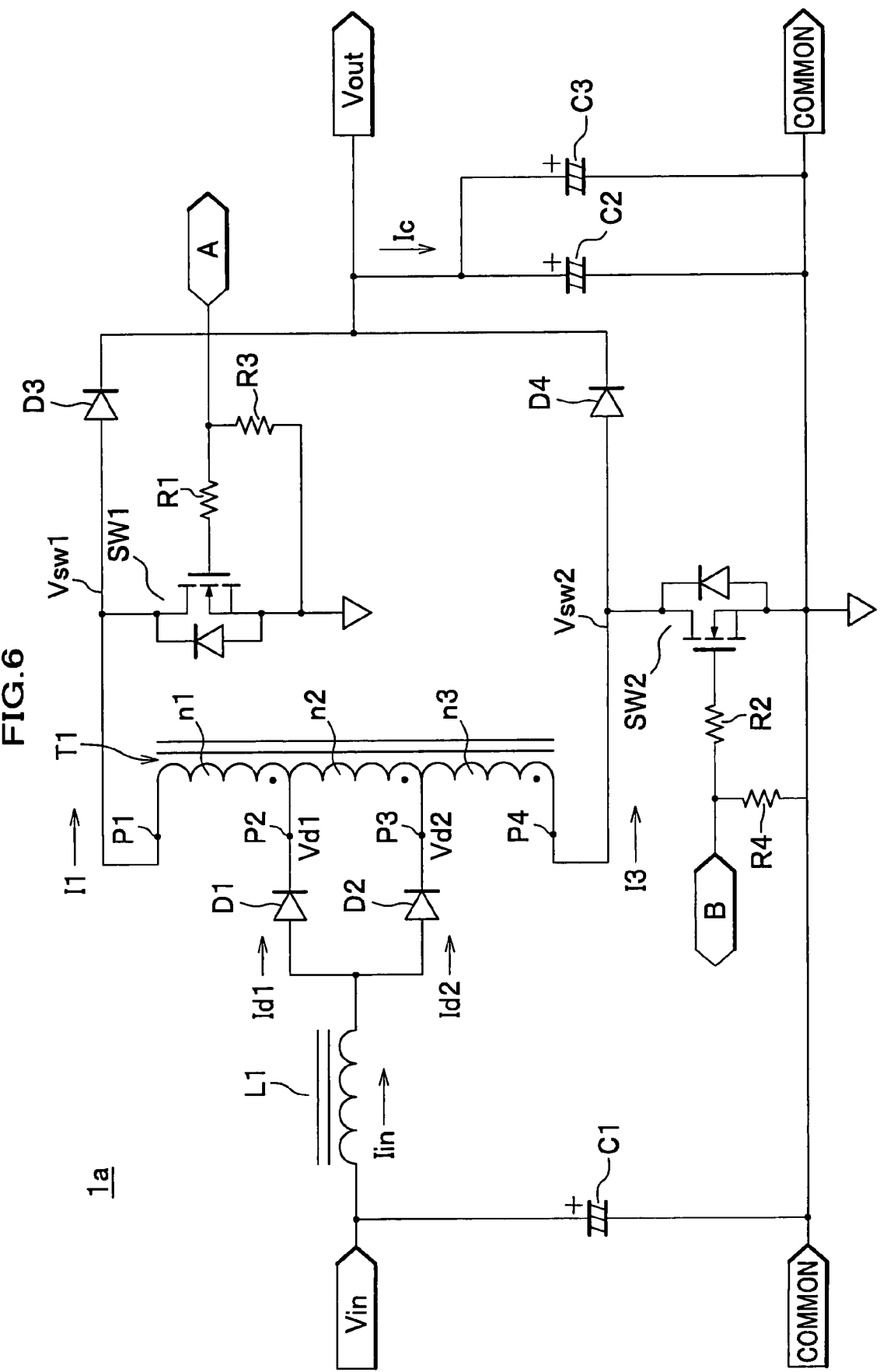
FIG. 6 is a circuit diagram illustrating an example of a configuration of a more practical booster circuit according to the first embodiment of the present invention.

FIG. 6 is a circuit diagram illustrating an example of a configuration of a more practical booster circuit according to the first embodiment of the present invention.

A booster circuit 1a shown in FIG. 6 has the same configuration as the booster circuit 1 in FIG. 1 except for the following points (a) to (d).

(a) A MOSFET is used as the switch elements SW1, SW2.

(b) Resistances R1, R2 are disposed in front of the gate terminal A of SW1 and the gate terminal B of SW2, respectively.

(c) Resistances R3, R4 are disposed between terminals or lead wires, which are not connected to SW1, SW2, of the resistance R1, R2 and the input/output common terminals.

(d) A smoothing capacitor C3 is connected in parallel to the capacitor C2 on the output side.

In the booster circuit 1a, the resistances R1, R2, which are disposed in front of the gate terminals A, B, limits a current to charge or discharge the gate capacity, and prevents a vibration of a waveform of the gate voltage. Furthermore, the resistances R1, R2 provided in the booster circuit 1a prevent the potentials of the gate terminals A, B from becoming unstable when the power source of the booster circuit 1a is turned on and off. In the booster circuit 1a, a MOSFET is used as the switch elements SW1, SW2, thereby making it possible to operate at a high speed. Furthermore a ripple current can be reduced because a switching frequency becomes high. In the booster circuit 1a, the smoothing capacitor C3 is connected in parallel to the capacitor C2 on the output side, and therefore the ripple current can be further reduced.

EXAMPLE 1

In the circuit configuration shown in FIG. 6, the duty ratios, which are defined as the ratios of the ON periods relative to the repetition periods of the driving signals A, B, are determined to be 26%, respectively, and the input voltage 30V is applied.

When the switch elements SW1, SW2 are both turned off on the above condition, the input voltage DC 30V is applied to the inductor L1, the diodes D1/D2, the windings n1/n3, and the diodes D3/D4, and thereby the output voltage of about 28V is obtained. The voltage decreases when passing through each of the devices by the voltage drop.

When the switch element SW1 is turned on and the switch element SW2 is turned off, voltages of the lead wires P1 to P4 are 0V, 20V, 40V, and 60V, respectively.

EXAMPLE 2

Next, a description will be given on an operation when the number of turns N2 is twice as large as the number of turns N1, N3, that is, N1:N2:N3=10 T:20 T:10 T. The duty ratios of the driving signals A, B are determined to be 25% and the input voltage 25V is applied, thereby obtaining the output voltage 65V and the output current 0.5A. FIG. 7 is a graph showing signal waveforms of each of the devices of the booster circuit 1a on the above condition. As shown in FIG. 7, when the switch element SW1 is electrically conducted (turned on), the drain voltage Vsw1 is reduced to 0V (indicated by #1 in FIG. 7). In this instance, the whole input current Vin flows through D1, and the cathode voltage Vd1 of the diode D1 is about 15V. Although not shown in FIG. 7, the cathode voltage Vd2 of the diode D2 (see FIG. 6) is equal to Vd1 (#2) as when SW2 is turned on, and therefore Vd2 is about 49V. The output voltage Vout is the drain voltage Vsw2 of the switch element SW2 (not shown in FIG. 7), and is equal to the drain voltage Vsw1 (#3) of the switch element SW1 as when SW2 is turned on. In this case, the output voltage Vout is 65V. Therefore, the voltages of about 15V, 34V (=49V−15V), and 16V (=65V−49V) are applied to the windings n1, n2, n3, respectively. Although measurements performed by experimental devices cause certain errors, voltage ratios of the windings n1, n2, n3 are determined to be 1:2:1, which are equal to ratios of the number of turns.

A waveform of the current I1, which flows through the winding n1, when SW1 is turned on is denoted by #4, and a waveform of the current I1 induced when SW2 is turned on is indicated by #5. The ratio of the peak values of the waveforms #4, #5 is 3:1.

To summarize the above, when SW1 is turned on and the voltage 15V is applied to the winding 1, the voltage 50V (=34V+16V), which is about three times higher than 15V, is induced in the windings n2 and n3. In this instance, the current I3 flowing through the windings n2, n3 is approximately ⅓ of the current I1 flowing through the winding n1. Therefore, the current I1 and the current I3 flow through the winding n1 and the windings n2, n3, respectively, in the direction such that magnetic fluxes in the core of the transformer T1 are offset, thereby generating equal ampere turns in the windings. As described above, the magnetic offset is carried out in the same manner as when N1:N2:N3=1:1:1.

As is evidenced from the equation (5), the increase of the number of turns of the central winding n2 improves the voltage boost ratio, and at the same time an effect of the magnetic offset is maintained. This is effective where N1:N2:N3=1:1.5:1=12 T:18 T: 12 T, although an image of the measurement is not shown here. According to the present invention, as described above, a current flows through the windings of the transformer T1 such that the magnetic fluxes in the core of the transformer T1 are offset, thereby reducing the possibility of magnetic saturation in the core and making it possible to reduce the size of the transformer T1. It is, therefore, possible to reduce the size of a power supply circuit or system, which employs the booster circuit according to the present invention.

The voltage values illustrated in FIG. 7 are obtained by setting up a specific circuit constant and an operating condition in order to explain the embodiment. The voltage value can be greatly changed by changing a circuit constant and an operating condition.

<Low Ripple Property>

Figure 8A:
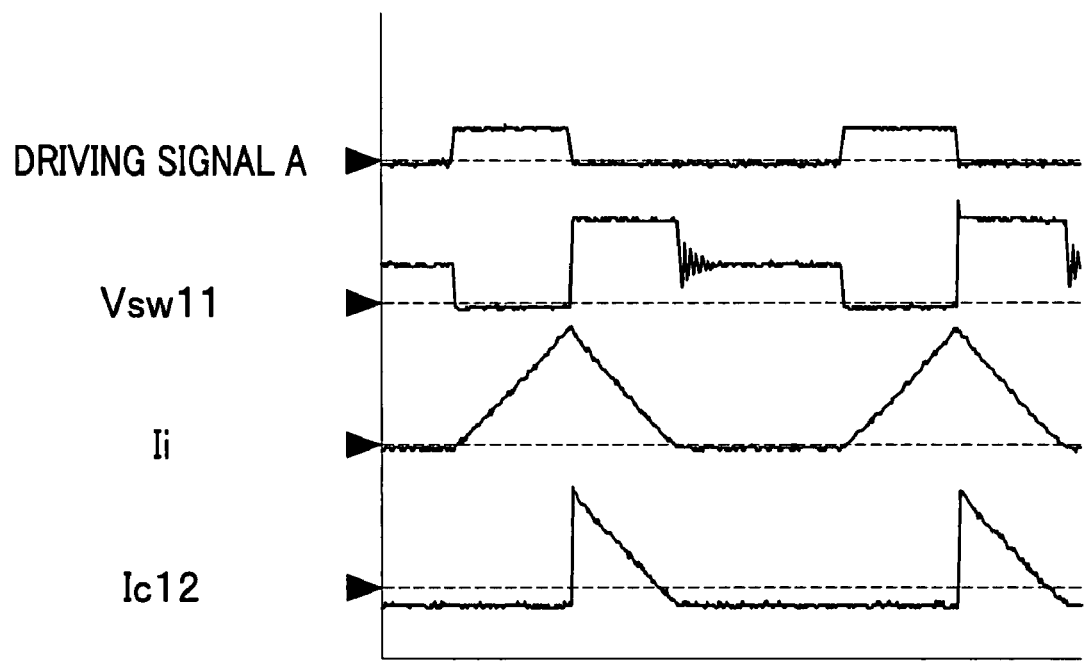
FIGS. 8A and 8B are views to compare ripple currents in a classical booster circuit in FIG. 12 and the booster circuit according to the present invention in FIG. 6.
Figure 8B:
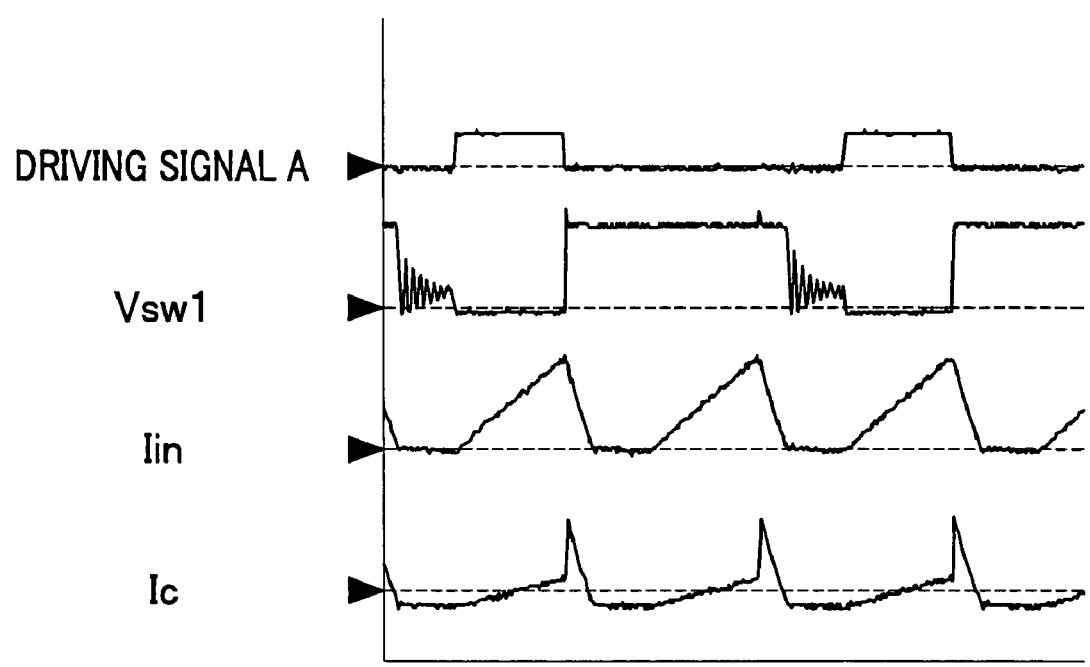

A secondary effect of the present invention is to generate a very small amount of output current ripples. A description will be given on this with reference to FIGS. 6, 12, and 8. FIG. 8A is a graph showing the input current Ii and the current Ic12 flowing through the capacitor C12 on the output side in the booster circuit shown in FIG. 12. FIG. 8B is a graph showing the input current Iin and the ripple current Ic flowing through the smoothing capacitor on the output side when the booster circuit 1a in FIG. 6 operates under the condition mentioned below.

The booster circuit 9 shown in FIG. 12 is experimentally produced with the 50 µH inductor L11 and the 100 µF capacitor C12, and operates with the input voltage 30V, the output voltage 60V, and the current 1 A. On the other hand, as an example of the embodiment, the booster circuit 1a in FIG. 6 is experimentally produced with the 20 µH inductor L1 and a parallel capacity 66 µF of the capacitors C2, C3, and operates with the input voltage 30V, the output voltage 60V, and the current 1 A.

As mentioned above, the booster circuit 1a of the present invention has smaller circuit constants of the inductor on the input side and the output smoothing capacitor than the conventional booster circuit 9 shown in FIG. 12. As shown in FIG. 8, an effective value of the ripple current Ic12 in the conventional booster circuit 9 is 2.2 Arms (root mean square), and on the contrary an effective value of the ripple current Ic in the booster circuit 1a is 1.2 Arms. Therefore, the booster circuit 1a has less ripple current than the conventional booster circuit 9.

Furthermore, only ⅔ of the current Iin (the current I1 in FIG. 3A and the current I3 in FIG. 3B) flows through each of the switch elements SW1, SW2, and therefore it is sufficient to provide the switch element having a smaller current capacitance value than the conventional one when the same voltage and current (capacity) are output by a DC/DC converter.

Specifically, in the booster circuit 9 shown in FIG. 12, the current, which flows through the switch element when the switch element is electrically conducted, is completely equal to the input current Ii shown in FIG. 8A, and the maximum value of the current is about 8A. On the contrary, in the booster circuit 1a of the present invention, when the switch element SW1 or SW2 is turned on, the current I1 or the current I3, which respectively flows through SW1 or SW2, becomes the maximum value of 4 A while the current Iin of the inductor L1 becomes the maximum value of 6 A. In other words, in the booster circuit according to the embodiment of the present invention, the total current of 6 A can be controlled by the switch having the capacity of 4A, thereby making it possible to reduce the size of the switch element.

The above description has been given to explain the present invention by taking as an example the embodiment having the specific configuration, but the present invention is not limited to such a configuration.

Second Embodiment

Figure 9:
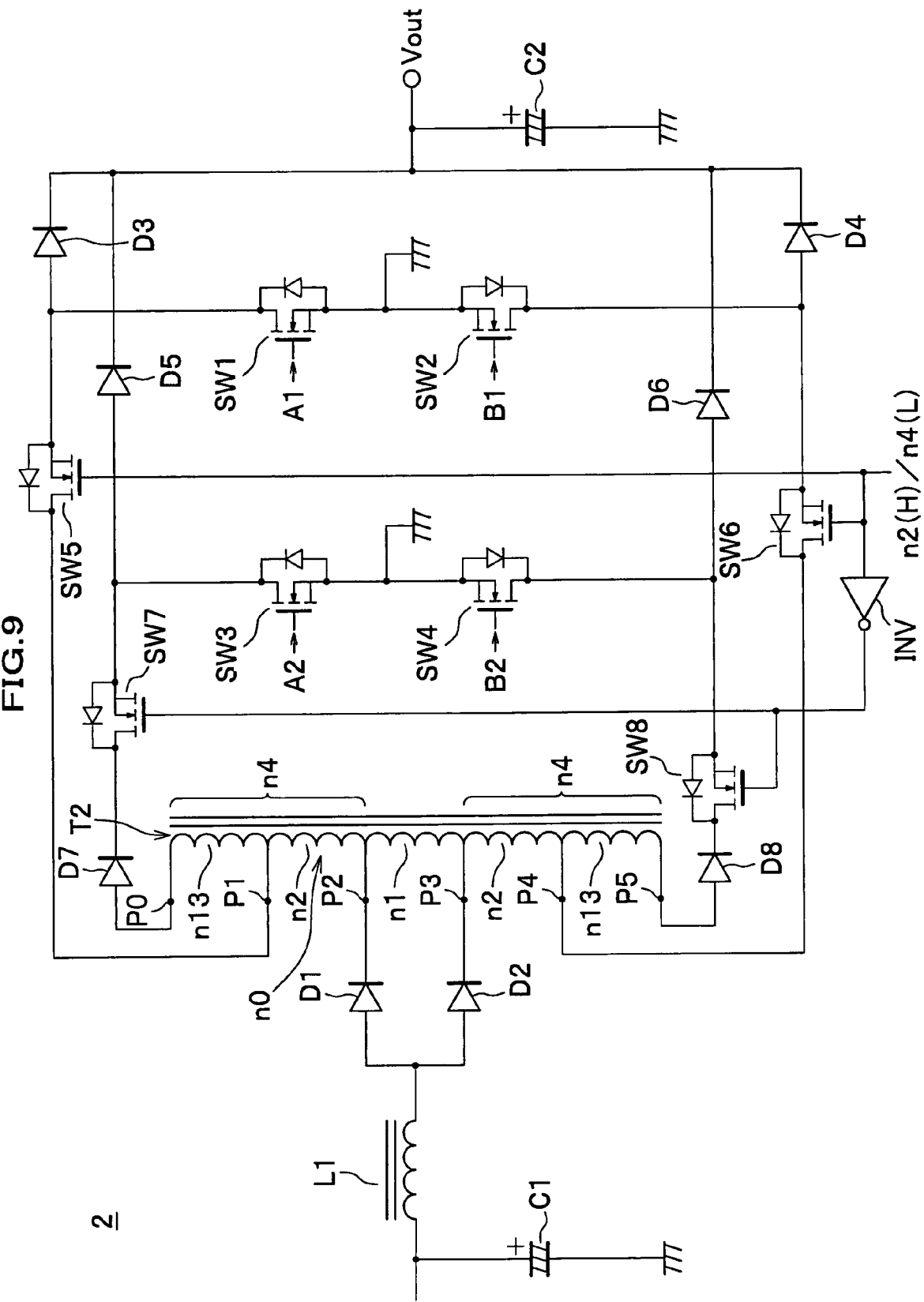
FIG. 9 is a circuit diagram showing an example of a booster circuit according to the second embodiment of the present invention.

For example, FIG. 9 is a circuit diagram showing an example of a booster circuit, which selects an output voltage between two voltage values, according to the second embodiment of the present invention. A booster circuit 2 in FIG. 9 has the same configuration as the booster circuit 1 in FIG. 1, except that the transformer T1 is replaced by a transformer T2, and switch elements SW3 to SW8, diodes D5, D6, D7, D8, and an inverter INV are added in the circuit. The windings n2, n1, n2 in the booster circuit 2 in FIG. 9 correspond to the windings n1, n2, n3 in the booster circuit 1 in FIG. 1. In FIG. 9, the windings having the same number of turns are denoted by the same reference mark.

In the transformer T2, the windings n13 having the same number of turns are added on both ends of the winding n0 of the transformer T1, the lead wires P1, P4 are provided as a tap, and lead wires P0, P5 are added. A winding between P0 and P2 and a winding between P3 and P5 are defined as a winding n4. A switch element SW5, which is dedicated to selecting a winding, is disposed on the wire connecting the tap P1 and the switch element SW1, and a switch element SW6, which is dedicated to selecting a winding, is disposed on the wire connecting the tap P4 and the switch element SW2. The switch elements SW5, SW6 are turned on when a winding selection signal n2/n4 is, for example, a logical 1. The reference "n2 (H)/n4 (L)" shown in FIG. 9 means that the winding n2 is selected when a "HIGH" is input to SW5, SW6, and the winding n4 is selected when a "LOW" is input to SW5, SW6.

The lead wires P0, P5 of the transformer T2 are respectively connected to one end of each of switch elements SW7, SW8, which are dedicated to selecting a winding, via the diodes D7, D8, the switch element SW3, SW4 are interposed between other end of each of SW7, SW8 and the input/output common conductor. Anodes of the diodes D5, D6 are connected to a connection point of SW3 and SW7 and a connection point of SW4 and SW8, respectively. Cathodes of the diodes D5, D6 are connected to the output terminal Vout, together with cathodes of the diodes D3, D4. A signal, which is generated by inverting the winding selection signal n2(H)/n4(L) by the inverter INV, is applied to control terminals of SW7, SW8. As mentioned above, either of the windings n2 and n4 of the transformer T2 can be selectively used by the winding selection signal n2(H)/n4(L). Therefore, when the number of turns of the windings n1, n2, n4 are N1, N2, N4, the two different output voltages, which are determined by the two different ratios of the number of turns, that is, N1:N2, and N1:N4, are switched from one to another by the winding selection signal n2(H)/n4(L).

In the present embodiment, when a current is chopped at the taps P1, P4 of the transformer T2 by the switch elements SW1, SW2, a negative voltage occurs at the lead wires P0, P5 side. For this reason, when a normal MOSFET or IGBT is used as the switch element, the current flows from the common terminal COMMON to the lead wires P0/P5 through the switch element SW3, SW4, SW7, SW8, which include a parasitic diode. The diodes D7, D8 are provided to prevent this current.

Figure 10:
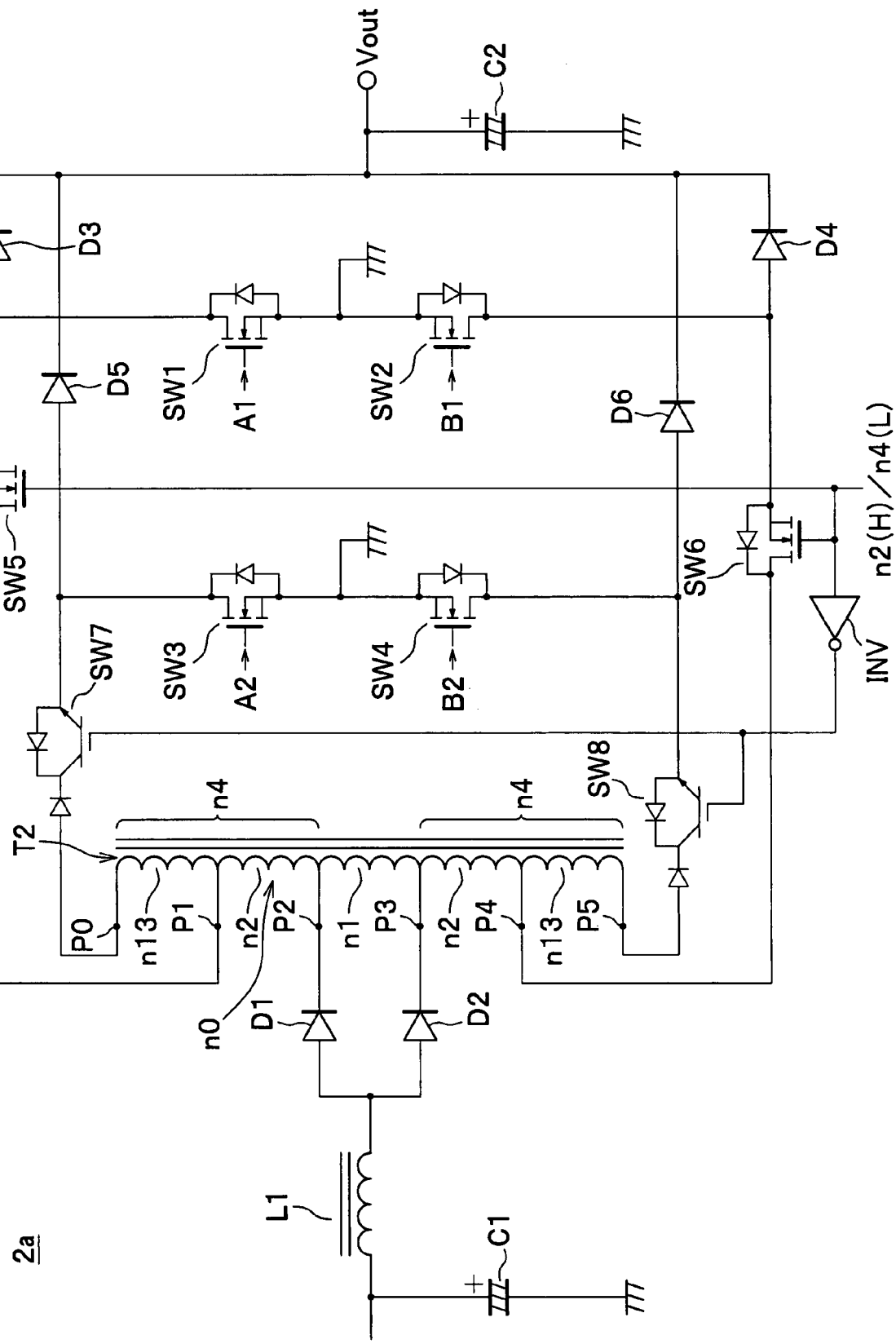
FIG. 10 illustrates a modified example of the booster circuit according to the second embodiment of the present invention.

FIG. 10 illustrates a modified example of the booster circuit according to the second embodiment of the present invention. A booster circuit 2a in FIG. 10 has the same configuration as the booster circuit 2 in FIG. 9, except that the diodes D7, D8 are removed, and instead, the switch element SW7, SW8 are replaced by reverse blocking IGBTs including a diode dedicated to preventing a reverse current. The above description of the second embodiment of the present invention is applied to the booster circuit 2a in FIG. 10.

The duty cycles of the driving signals A1, B1 of the switch elements SW1, SW2 in FIG. 9 and the duty cycles of the driving signals A2, B2 of the switch elements SW3, SW4 may be the same or different.

In the second embodiment, the windings having the same number of turns are added on both ends of the winding n0 of the transformer T1 shown in FIG. 1. However, the taps P0, P5 may be added in the winding between P1 and P2 and the winding between P3 and P4 such that the winding between P1 and P2 and the winding between P3 and P4 are divided in the same ratio.

Furthermore, in the second embodiment, a circuit is added on the output side of the transformer T2, and the output voltage is selected from the two voltages by switching the originally provided output path and the added output path. Instead of this, the added lead wires or the taps P0, P5 may be used as an input terminal from the inductor L1 on the input side (the diodes D5, D6 are interposed between the taps P0, P5 and the inductor L1), and branches of the originally provided diodes D1, D2 and branches of the added diodes D5, D6 can be switched from one to another by the winding selection signal. When such a circuit is configured by using the transformer T2 in FIG. 9, the ratios of the numbers of turns are N1:N4 and (N1+2·N2):N13. The reference N13 denotes the number of turns of the winding n13.

The above-mentioned embodiment assumes that the input/output voltage is a positive voltage, but the input/output voltage may be a negative voltage in the present invention. In this instance, a polarity of a semiconductor element, such as a diode or a switch element, or an electrolytic capacitor may be reversed.

Third Embodiment

Figure 11:
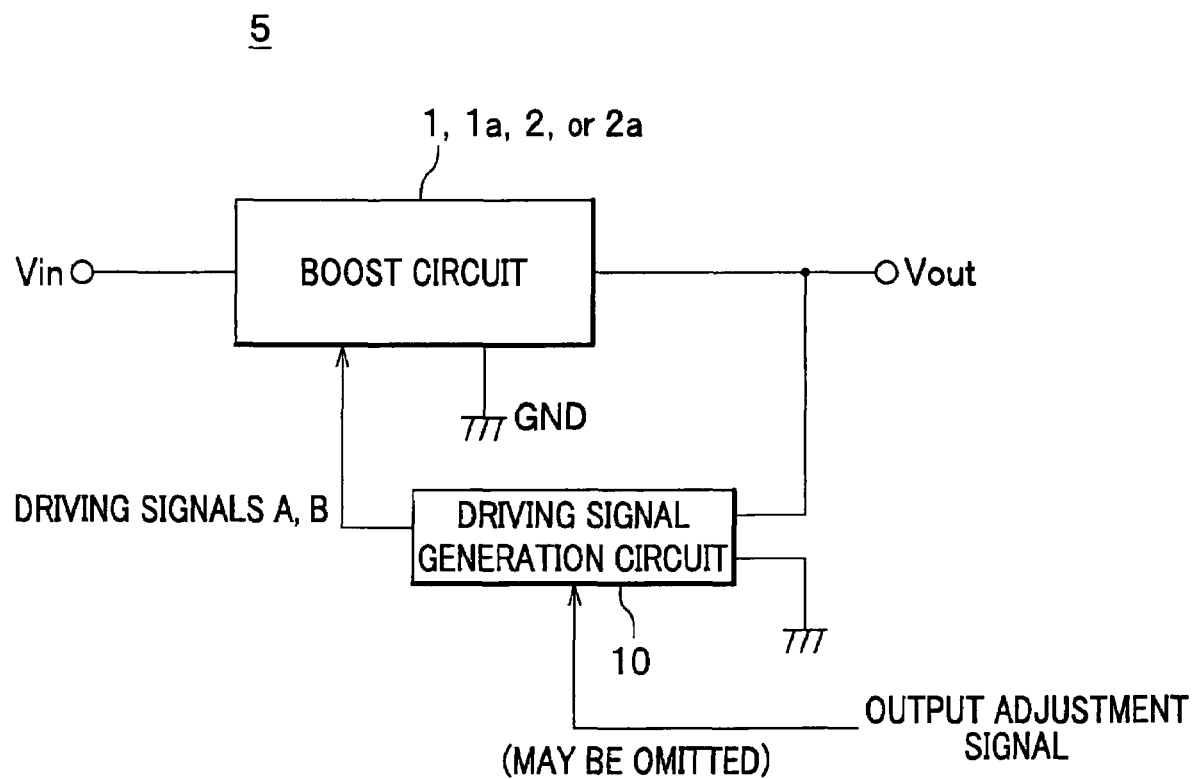
FIG. 11 is a block diagram schematically showing a configuration of a power supply circuit according to the third embodiment of the present invention.

FIG. 11 is a block diagram schematically showing a configuration of a power supply circuit according to the third embodiment of the present invention. A power source circuit 5 includes the above-mentioned booster circuit (booster DC/DC converter) 1, 1a, 2, or 2a (hereinafter referred to as a booster circuit 1/2 as a representative), and a driving signal generation circuit 10. Any booster circuit may be used as long as it uses the principle of the present invention. The driving signal generation circuit 10 monitors the output voltage Vout of the booster circuit 1/2, and supplies the driving signals A, B (or A1, B1, A2, B2) to the booster circuit 1/2 so that the output voltage Vout is in the range of a predetermined voltage value. The power supply circuit 5 in FIG. 11 makes it possible to obtain the boost voltage ratio, by which an output voltage is more than twice as high as an input voltage, as well as the booster circuits in FIGS. 1, 6, 9, and 10.

Furthermore, the driving signal generation circuit 10 may set the output voltage Vout by a signal (in FIG. 11, referred to as an output adjustment signal) applied from an external device within the range to be adjusted by the driving signals A, B. With such a configuration, it is possible to fine-tune the output voltage.

In the above-mentioned booster circuit according to the embodiments of the present invention, various modifications, changes, or additions can be made within the scope of the technical idea and principle of the present invention.

FIG. 1 shows an example of the transformer T1 where the taps are used, but the transformer T1 including three windings separately formed on the core may be used. In this instance, if two of the three windings have the same number of turns, each winding may be wound in any direction. However, it is necessary to connect the wire such that the windings having the same number of turns are located on both ends of the whole winding when the three windings are connected in series, and each winding forms a magnetic flux in the core in the same direction when a current is applied to the three serially connected windings. The three serially connected windings are denoted by n1, n2, and n3 from the end. A connection point of the windings n1 and n2 is denoted by P2, a connection point of the windings n2 and n3 by P3, the n1 side end of the three windings by P1, and the n3 side end of the three windings by P4, and thereby it is possible to operate such a circuit in the same manner as the circuit including the above-mentioned transducer using the taps.

What is claimed is:

1. A booster circuit comprising:
an input terminal and a common terminal, an input voltage applied to the input terminal and the common terminal;
an output terminal, in which an output voltage is provided on the common terminal;
a transformation unit that includes a first winding, a second winding, and a third winding, the windings wound in a same direction and connected in series;
a first rectifier unit provided between the input terminal and a connection point of the first winding and the second winding;
a second rectifier unit provided between the input terminal and a connection point of the second winding and the third winding;
a first switching unit provided between one end of the transformation unit and the common terminal;
a second switching unit provided between other end of the transformation unit and the common terminal;
a third rectifier unit provided between a connection point of the one end of the transformation unit and the first switching unit and the output terminal; and
a fourth rectifier unit provided between a connection point of the other end of the transformation unit and the second switching unit and the output terminal,
wherein the first winding and the third winding have an approximately same number of turns; and
the first switching unit and the second switching unit alternately open and close in response to a pair of control signals.

2. The booster circuit according to claim 1,
the circuit further comprising a coil provided with a conductor connecting the input terminal and a connection point of the first rectifier unit and the second rectifier unit.

3. The booster circuit according to claim 2,
the circuit further comprising a generation unit for generating the pair of control signals having a duty cycle to set the output voltage to a predetermined value.

4. The booster circuit according to claim 3,
the circuit further comprising a capacitor disposed between the input terminal and the common terminal.

5. The booster circuit according to claim 4,
the circuit further comprising a capacitor disposed between the output terminal and the common terminal.

6. The booster circuit according to claim 3,
the circuit further comprising a capacitor disposed between the output terminal and the common terminal.

7. The booster circuit according to claim 2,
the circuit further comprising a capacitor disposed between the input terminal and the common terminal.

8. The booster circuit according to claim 7,
the circuit further comprising a capacitor disposed between the output terminal and the common terminal.

9. The booster circuit according to claim 2,
the circuit further comprising a capacitor disposed between the output terminal and the common terminal.

10. The booster circuit according to claim 1,
the circuit further comprising a generation unit for generating the pair of control signals having a duty cycle to set the output voltage to a predetermined value.

11. The booster circuit according to claim 10,
the circuit further comprising a capacitor disposed between the input terminal and the common terminal.

12. The booster circuit according to claim 11,
the circuit further comprising a capacitor disposed between the output terminal and the common terminal.

13. The booster circuit according to claim 10,
the circuit further comprising a capacitor disposed between the output terminal and the common terminal.

14. The booster circuit according to claim 1,
the circuit further comprising a capacitor disposed between the input terminal and the common terminal.

15. The booster circuit according to claim 14,
the circuit further comprising a capacitor disposed between the output terminal and the common terminal.

16. The booster circuit according to claim 1,
the circuit further comprising a capacitor disposed between the output terminal and the common terminal.

17. The booster circuit according to claim 1,
wherein the first winding includes the a fourth winding and a fifth winding connected in series to the fourth winding, the fourth winding connected in series to the second winding and having a predetermined ratio of a number of turns to that of the second winding;
the third winding includes a sixth winding and a seventh winding connected in series to the sixth winding, the sixth winding connected in series to the second winding and having the predetermined ratio of the number of turns to that of the second winding, the fourth, the fifth, the second, the sixth, and the seventh windings wound in a same direction;
a first selection switching unit is disposed between a connection point of the fourth and the fifth windings and a connection point of the first switching unit and the third rectifier unit;
a second selection switching unit is disposed between a connection point of the sixth and the seventh windings and a connection point of the second switching unit and the fourth rectifier unit;
two circuits including a third selection switching unit and a fourth selection switching unit are disposed between the one end of the transformation unit and the common terminal, and between the other end of the transformation unit and the common terminal, respectively, each of the two circuits having a same configuration as the circuit connected between the connection point of the fourth and the fifth windings and the common terminal;
two diodes, which are provided to prevent a reverse current, are disposed between the one end of the transformation unit and the third selection switching unit, and between the other end of the transformation unit and the fourth selection switching unit, respectively;
the first selection switching unit and the second selection switching unit are switched by a selection signal to select an output voltage; and
the third and the fourth selection switching units are switched by a signal generated by inverting the selection signal.

* * * * *